United States Patent [19]
Park

[11] Patent Number: 5,432,555
[45] Date of Patent: Jul. 11, 1995

[54] IMAGE SIGNAL ENCODING APPARATUS USING ADAPTIVE 1D/2D DCT COMPRESSION TECHNIQUE

[75] Inventor: Hak-Jae Park, Incheon, Rep. of Korea

[73] Assignee: Daewoo Electronics Co., Ltd., Seoul, Rep. of Korea

[21] Appl. No.: 118,439

[22] Filed: Sep. 8, 1993

[30] Foreign Application Priority Data

Sep. 9, 1992 [KR] Rep. of Korea ............... 92-16454

[51] Int. Cl.⁶ ............................................. H04N 7/30
[52] U.S. Cl. ................................................. 348/404
[58] Field of Search ............ 348/397, 400, 401, 402, 348/403, 404, 407, 409, 410, 411, 412, 413, 415, 416, 390, 384, 405

[56] References Cited

U.S. PATENT DOCUMENTS

| | | | |
|---|---|---|---|
| 4,141,034 | 2/1979 | Netrauali et al. | 348/411 |
| 4,691,329 | 9/1987 | Juri et al. | 375/122 |
| 4,999,705 | 3/1991 | Puri | 358/136 |
| 5,068,724 | 11/1991 | Krause et al. | 358/133 |
| 5,091,782 | 2/1992 | Krause et al. | 358/135 |
| 5,196,930 | 3/1993 | Kadono et al. | 348/403 |

*Primary Examiner*—Howard W. Britton
*Assistant Examiner*—Bryan S. Tung
*Attorney, Agent, or Firm*—William F. Pinsak

[57] ABSTRACT

An improved image signal encoding apparatus for processing a digitized image signal for transmission thereof in a compressed form, comprising a horizontal one-dimensional compression path for compressing the digitized image signal utilizing a horizontal correlation therein to provide a first compression signal, a vertical one-dimensional compression path for compressing the digitized image signal utilizing a vertical correlation therein to provide a second compression signal, a two-dimensional compression path for compressing the digitized image signal utilizing the horizontal and the vertical correlations to provide a third compression signal; and a comparator for comparing a first compression error contained in the first compression signal, a second compression error contained in the second compression signal and a third compression error contained in the third compression signal so as to enable the selection of the compression signal having the least error.

3 Claims, 3 Drawing Sheets

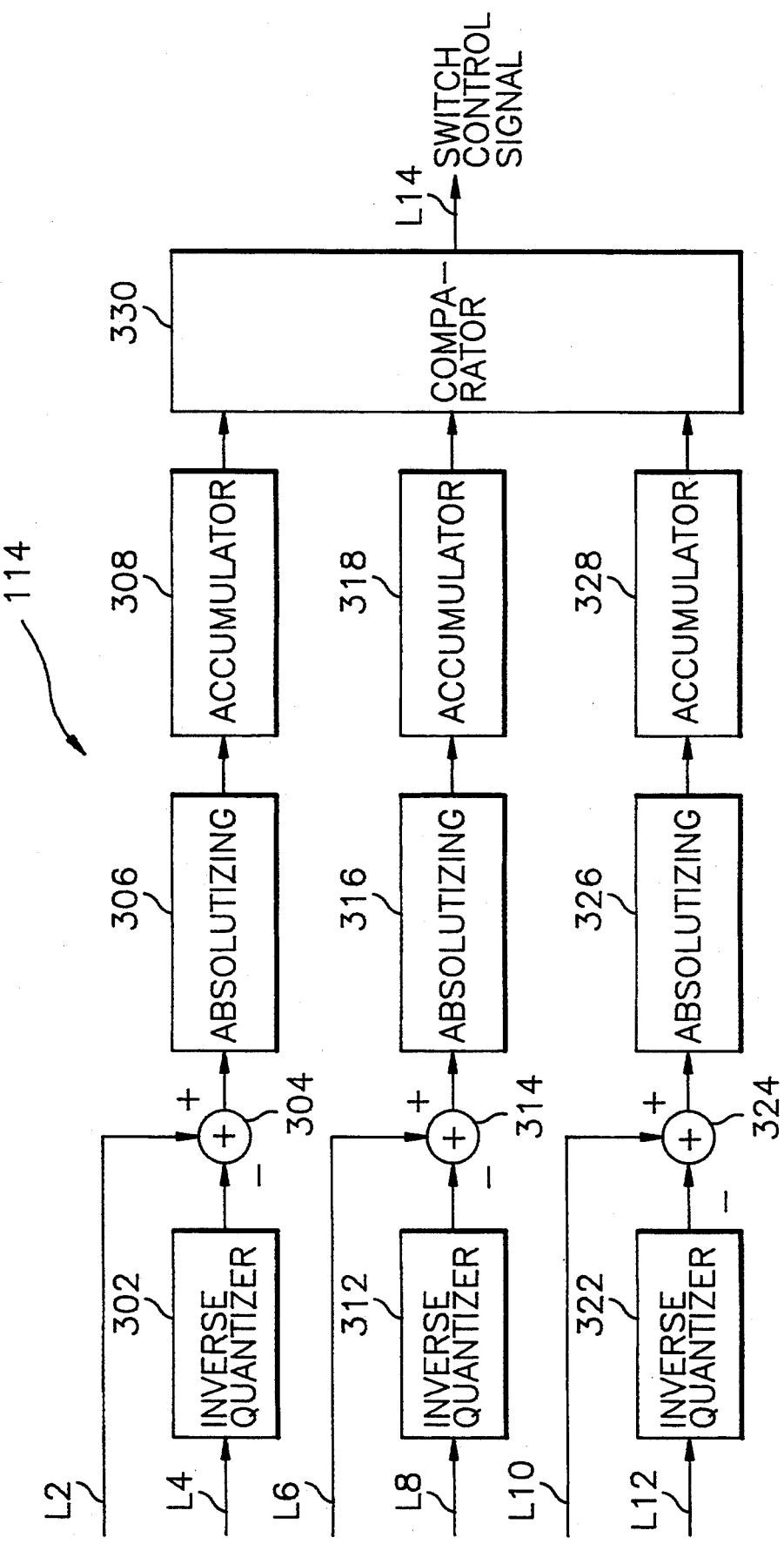

IMAGE SIGNAL ENCODING APPARATUS USING ADAPTIVE 1D/2D DCT COMPRESSION TECHNIQUE

FIELD OF THE INVENTION

The present invention relates to an image signal encoding apparatus for compressing image signals; and, more particularly, to an improved image signal encoding apparatus capable of compressing image signals for the transmission thereof through the use of a combined one/two dimensional (1D/2D) DCT compression technique.

DESCRIPTION OF THE PRIOR ART

In various electronic/electrical applications such as high definition television and video telephone systems, an image signal may need be transmitted in a digitized form. When the image signal comprising a sequence of image "frames" is expressed in a digitized form, there is bound to occur a substantial amount of digital data: for each line of an image frame is defined by a sequence of digital data elements referred to as "pixels". Since, however, the available frequency bandwidth of a conventional transmission channel is limited, in order to transmit the substantial amounts of digital data through the limited channel, the use of an image signal encoding apparatus often becomes necessary to compress the image signal.

The image signal can be normally compressed without seriously affecting its integrity because there usually exist certain correlationships among some of the pixels in a single frame and also among those of neighboring frames. From the image signal compression perspective, such correlation may be considered as a redundancy.

Accordingly, most image signal encoding apparatus of prior art employ various compression techniques(or coding methods) built on the idea of utilizing or reducing the redundancies. Such compression techniques can be classified into three categories.

A first category of compression techniques is the so-called predictive method, also known as the interframe coding, which is based on the concept of reducing the redundancy between neighboring frames. In the predictive method, the luminance value of a pixel in a current frame to be transmitted is predicted from the luminance value of its corresponding, previously transmitted pixel in its previous frame, then the predictive error signal, which represents the differences between the luminance values of the pixels in the current frame and the predicted values, is compressed(or coded); and the compressed data is then transmitted.

A predictive method of late utilizes a motion estimation and compensation method. This method is described, for example, in Staffan Ericsson, "Fixed and Adaptive Predictors for Hybrid Predictive/Transform Coding", *IEEE Transactions on Communications, COM*-33, No. 12(December 1985); and in Ninomiya and Ohtsuka, "A Motion-Compensated Interframe Coding Scheme for Television Pictures", *IEEE Transactions on Communications, COM*-30, No. 1(January 1982), both of which are incorporated herein by reference. In this method, an image frame is divided into a plurality of subimages(or blocks). The size of a subimage typically ranges between 8×8 and 32×32 pixels. The motion estimation and compensation is a process of determining the movement of objects between a current frame and its previous frame, and predicting the current frame according to the motion flow to produce a predictive error signal representing the difference between the current frame and its prediction.

A second category of coding methods comprises a transform technique which utilizes the redundancies existing in a single frame. This coding technique, which exploits only the spatial correlation, is called the intraframe coding. One of such transform methods is a two-dimensional DCT(Discrete Cosine Transform). This technique is described in Chen and Pratt, "Scene Adaptive Coder", *IEEE Transactions Communications, COM*-32, No. 3(March 1984), which is incorporated herein by reference. The two-dimensional DCT converts a block of digital image signal, for example, a block of 8×8 pixels, into a set of transform coefficient data. By processing such transform coefficient data with a variable length coding(VLC) method such as run-length Huffman coding, the amount of data to be transmitted can be effectively compressed.

A third category of compression techniques makes use of the so-called hybrid coding, which is a combination of the first and the second categories of techniques.

Currently, the hybrid coding method is most commonly employed. Also, to increase the compressibility of image signals, the apparatus may employ other additional compression algorithms adapted to specific conditions. One of such additional compression algorithms is an adaptive 1D/2D DCT compression technique.

Normally, in most compression processes, two dimensional correlation, i.e., both horizontal and vertical correlation, is employed. However, in certain image signals, such as the motion compensated prediction error signals and horizontal or vertical line pattern signals, it is also possible to have a meaningful correlation in one directional dimension only. In this case, one dimensional DCT may be sufficient and more economical than two dimensional DCT. Accordingly, it is sometimes desirable to compress image signals making use of an adaptive 1D/2D DCT compression technique.

SUMMARY OF THE INVENTION

It Is, therefore, an object of the invention to provide an improved image signal encoding apparatus which is capable of compressing image signals by employing an adaptive 1D/2D DCT compression technique.

It is another object of the invention to provide an improved image signal encoding apparatus which is capable of selecting a more efficient DCT compression technique in an economical fashion.

In accordance with the invention, there is provided an improved image signal encoding apparatus for processing a digitized image signal for transmission thereof in a compressed form, comprising: first means for compressing the digitized image signal utilizing a horizontal correlation therein to provide a first compressed image signal; second means for compressing the digitized image signal utilizing a vertical correlation therein to provide a second compressed image signal; third means for compressing the digitized image signal utilizing the horizontal and the vertical correlations to provide a third compressed image signal; and a comparator for comparing a first compression error contained in the first compression signal, a second compression error contained in the second compression signal and a third compression error contained in the third compression signal so as to enable the selection of the compression signal having a least error.

BRIEF DESCRIPTION OF THE DRAWINGS

The above and other objects and features of the present invention will become apparent form the following description of the preferred embodiments given in conjunction with the accompanying drawings, in which:

FIG. 3 is a block diagram of an error evaluation and selection circuitry that can be used in the apparatus of FIG. 1.

DETAILED DESCRIPTION OF THE PREFERRED EMBODIMENTS

Figure 1:
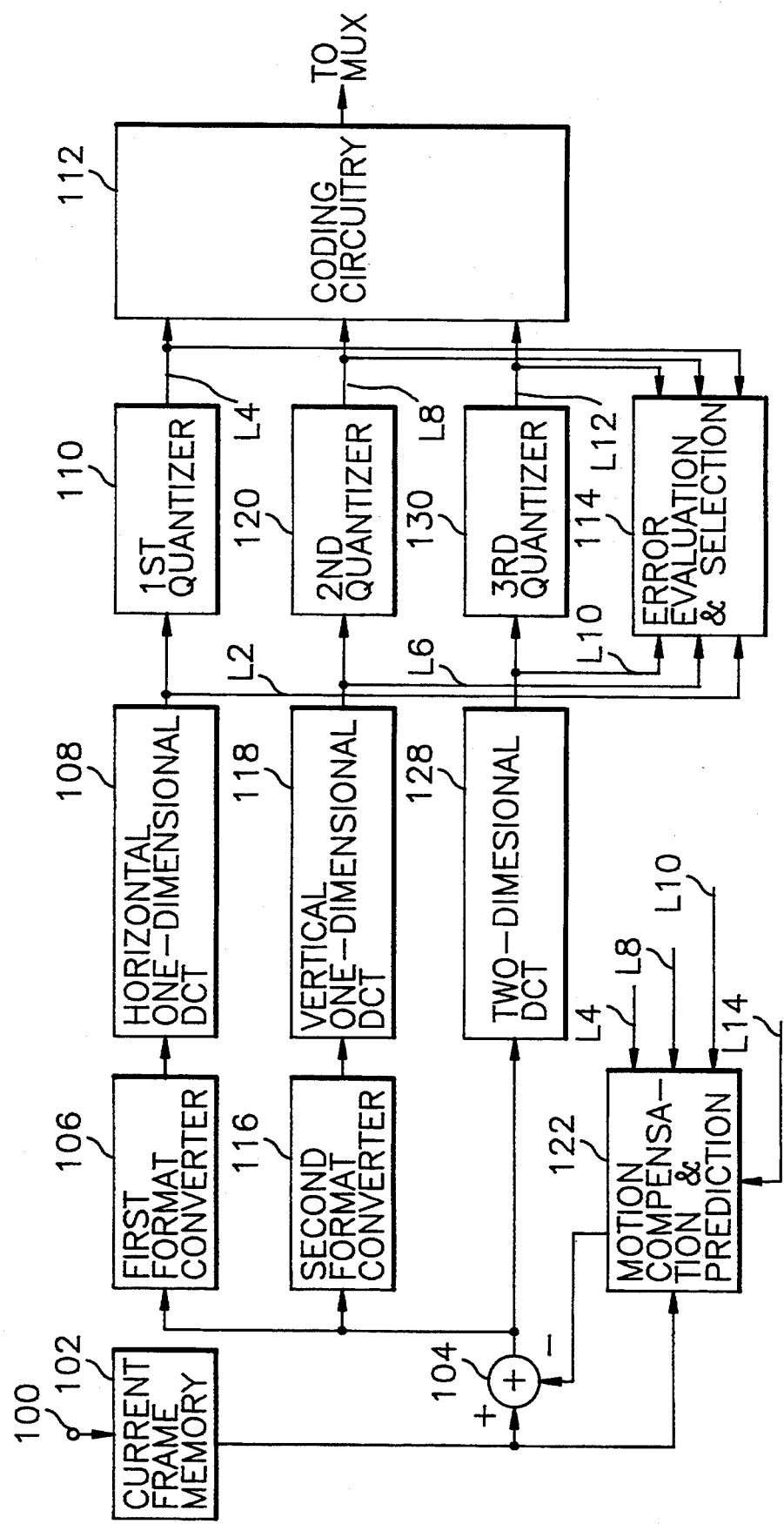
FIG. 1 is a block diagram depicting an image signal apparatus using an adaptive 1D/2D DCT compression technique in accordance with the invention.

FIG. 1 illustrates an image signal encoding apparatus using an adaptive 1D/2D DCT compression technique in accordance with a preferred embodiment of the present invention.

In accordance with the present invention, image data such as a digitized image signal is provided through a terminal 100 to a current frame memory 102. The process of digitizing such an image signal is well known in the art.

Image data is decomposed at the current frame memory 102 into blocks of a size appropriate for data compression. The blocks of data are fed to a subtractor 104 and a motion compensation and prediction block 122. The decomposed image data is predicted by the motion compensation and prediction block 122 based on the image data of its preceding image frame. The predicted image data, i.e., the predictive signal from the motion compensation and prediction block 122 is subtracted from the image retrieved from the current frame memory 102 to produce a predictive error signal.

The predictive error signal is then fed to a horizontal one-dimensional compression path, a vertical one-dimensional compression path and a two-dimensional compression path, respectively.

The horizontal 1D compression path comprises a first format converter 106, a horizontal one-dimensional Discrete Cosine Transform(1H DCT) block 108 and a first quantizer 110; the vertical 1D compression path comprises a second format converter 116, a vertical one-dimensional Discrete Cosine Transform(1V DCT) block 118 and a second quantizer 120; and the 2D compression path comprises a two-dimensional Discrete Cosine Transform(2D DCT) block 128 and a third quantizer 130. The output signal from each of said quantizers is fed, respectively, through line L4, L8 or L12 to a coding circuitry 112.

In the horizontal one-dimensional compression path, each block of image data is rearranged through the first format converter 108 into a horizontal one-dimensional data. The horizontal 1D data is transformed by the 1H DCT block 108 into a set of horizontal one-dimensional transform coefficients which have a statistic distribution in the frequency region between a d.c. component zone up to a high frequency zone and which have different levels of electric power. The electric power of the transform coefficients is locally distributed, i.e., concentrated on a local frequency zone which includes the d.c. component and a low frequency zone near the d.c. component. This shows that non-zero or significant transform coefficients mainly appear in the low frequency zone; and that zero or insignificant transform coefficients mainly appear in the high frequency zone, which may be truncated or need not always be transmitted.

Further, in the horizontal one-dimensional compression path, the set of transform coefficients is quantized by the first quantizer 110 into a first quantization signal. The quantization is a process of assigning to a selected transform coefficient a reconstruction or quantization level to thereby represent the set of transform coefficients with a finite number of bits.

In the vertical one-dimensional compression path, each block of image data is rearranged through the second format converter 116 into a vertical one-dimensional data. The vertical one-dimensional data is transformed by the 1V DCT block 118 into a set of vertical one-dimensional transform coefficients, which is then quantized by the second quantizer 120 to produce a second quantization signal, also provided to the coding circuitry 112.

In the two-dimensional compression path, the predictive error signal is transformed into a set of two-dimensional transform coefficients, which is quantized at the third quantizer 130 to produce a third quantization signal, which is then provided to the coding circuitry 112.

Figure 2:
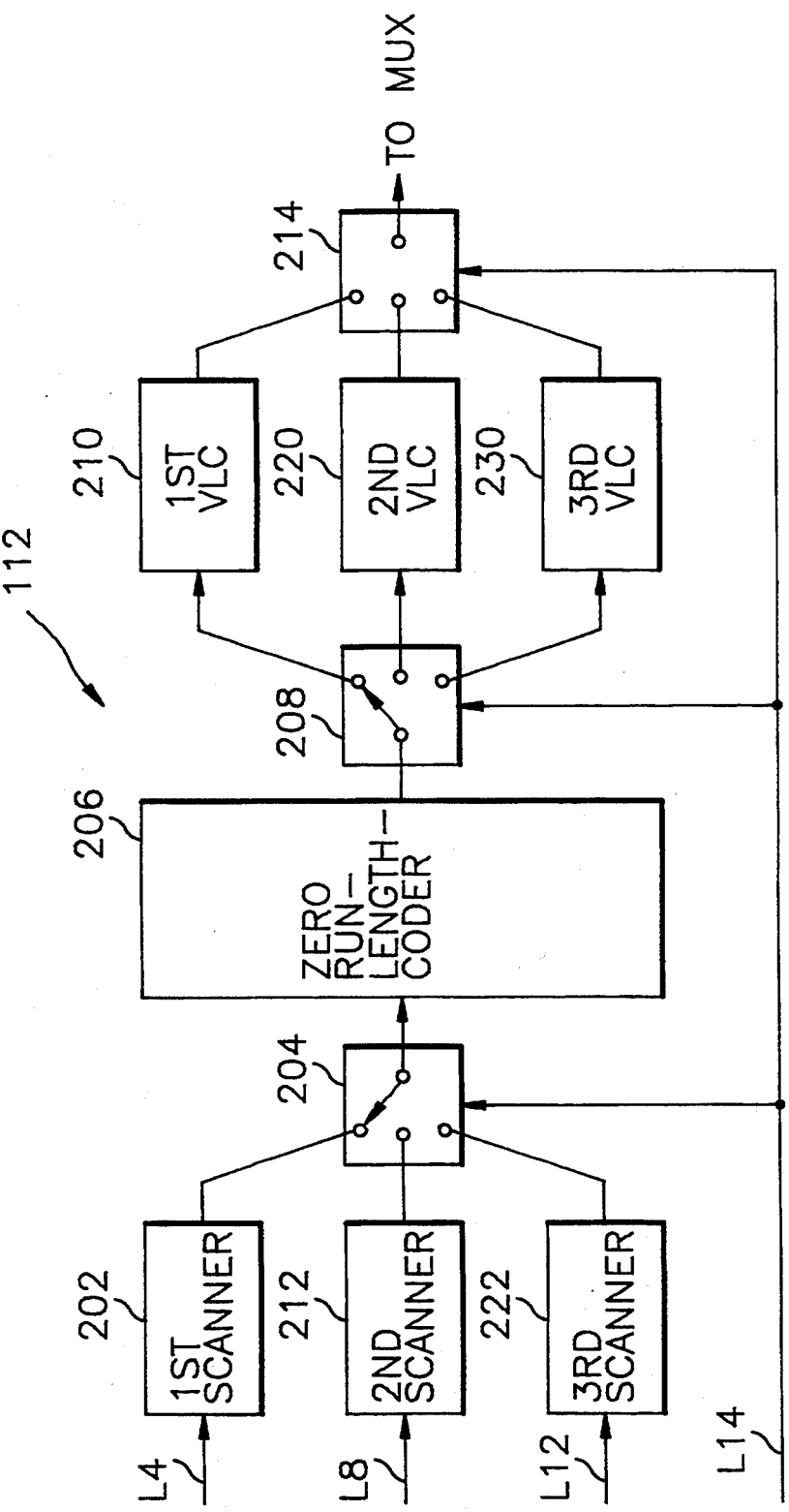
FIG. 2 is a block diagram of a coding circuitry that can be used in the apparatus of FIG. 1.

The coding circuitry 112 is illustrated in a greater detail in FIG. 2. The coding circuitry 112 includes scanners 202, 212 and 222, a zero run-length coder 206, variable length coders 210, 220 and 230 and switches 204, 208 and 214.

Each of the quantization signals provided through lines L4, L8 and L12 is scanned with a predetermined scanning method adapted to the particular distribution pattern of the transform coefficients. For example, the first scanner 202 may use a vertical scanning method, the second scanner 212 may employ a horizontal scanning method and the third scanner 222 may perform a zigzag scanning. Each of the scanning methods may be preferably operated progressively from the low frequency components towards the high frequency components of the transform coefficients.

Each of said scanned quantization signals is provided through the switch 204 to the zero run-length coder 206. The coder 206 encodes the scanned quantization signal by utilizing the zero level of transform coefficients, which mainly appear in the high frequency zone as mentioned above, to produce zero run-length codes. The run-length coding method is well known in the art.

Zero run-length codes are provided through the switch 208 to each of variable length coders 210, 220 and 230. In each of the variable length coders, a plurality of code sets adapted to each of the compression paths is memorized to define a respective relationship between each zero run-length code and its corresponding variable length code. Each of the coders encodes the zero run-length code to provide a variable length code to a multiplexer(not shown) which multiplexes the variable length code and other compression information such as motion vectors, which are generated in the motion compensation and prediction block 122.

In the meanwhile, in accordance with the invention, selection among the horizontal one-dimensional, the vertical one-dimensional and the two-dimensional compression paths is made on a block-by-block basis by comparing the compression error contained in the compressed data from each path. In the preferred embodiment, the selection is made by comparing the quantization errors.

The error evaluation and selection block 114 is illustrated in a greater detail in FIG. 3. The block 114 includes a horizontal compression, a vertical compression and a two-dimensional compression error evaluating components and a comparator 330. The error evaluating components have inverse quantizers(IQs) 302, 312 and 322, subtractors 304, 314 and 324, absoluters 306, 316 and 326 and accumulators 308,318 and 328.

From the horizontal one-dimensional, the vertical one-dimensional and the two-dimensional compression paths, when the respective unquantized signals are provided through lines L2, L6 and L10, and the quantized signals are provided through lines L4, L8 and L12, respectively, each of the differences between them is calculated at each of subtractors 304, 314 and 324. At this time, quantized signals provided through lines L4, L8 and L12 are inversely quantized prior to their subtraction. Each of the difference signals is absoluted by absoluters 306,316 and 326 and accumulated at accumulators 308,318 and 328.

The comparator 330 compares each of the accumulated quantization error signals on a block-by-block basis to provide through line 14 a switch control signal to the switches provided in the coding circuitry 112 and the motion compensation and prediction block 122.

Referring back to FIG. 1 the motion compensation and prediction block 122 produces the predictive signal utilizing the motion compensation technique. The block 122 has three decompression paths corresponding to the three compression paths and a switch which is responsive to the switch control signal to select a decompressed signal. Further, the block 122 has a previous frame memory where the selected decompressed signal is stored until it can be used for the next frame prediction.

The selective use of the 1D/2D DCT compression technique in accordance with the invention can be effectively employed in improving the image quality of digitally transmitted signals.

While the present invention has been shown and described with reference to the particular embodiment, it will be apparent to those skilled in the art and many changes and modifications may be made without departing from the spirit and scope of the invention as defined in the appended claims.

What is claimed is:

1. An improved image signal encoding apparatus for processing a digitized image signal for transmission thereof in a compressed form, comprising:
    first means for compressing the digitized image signal utilizing a horizontal correlation therein to provide a first compression signal, said first means having a horizontal one-dimensional transformer for transforming the digitized image signal into a set of horizontal one-dimensional transform coefficients and a horizontal one-dimensional quantizer for quantizing the set of horizontal one-dimension transform coefficients;
    second means for compressing the digitized image signal utilizing a vertical correlation therein to provide a second compression signal, said second means including a vertical one-dimensional transformer for transforming the digitized image signal into a set of vertical one-dimensional transform coefficients and a vertical one-dimensional quantizer for quantizing the set of vertical one-dimensional transform coefficients;
    third means for compressing the digitized image signal utilizing both the horizontal correlation and the vertical correlations to provide a third compression signal, said third means having a two-dimensional transformer for transforming the digitized image signal into a set of two-dimensional transform coefficients and a two dimensional quantizer for quantizing the set of two-dimensional transform coefficients; and
    a comparator for comparing a first compression error contained in the first compression signal, a second compression error contained in the second compression signal and a third compression error contained in the third compression signal so as to enable the selection of the compression signal having the least error.

2. The apparatus in accordance with claim 1, wherein the comparator evaluates quantization errors occurring at said horizontal one-dimensional quantizer, said vertical one-dimensional quantizer and said two-dimensional quantizer.

3. The apparatus in accordance with claim 1, wherein each of said first means, said second means and said third means further includes a scanner for scanning the set of quantized transform coefficients, a zero run-length coder for encoding the scanned quantized transform coefficients to provide zero run-length codes and a variable-length coder for encoding the zero run-length codes to provide variable length codes.

* * * * *